Patented May 3, 1932

1,856,602

UNITED STATES PATENT OFFICE

EDMOND T. TISZA AND BERNARD JOOS, OF YONKERS, NEW YORK, ASSIGNORS TO THE PYRIDIUM CORPORATION, OF NEPERA PARK, NEW YORK, A CORPORATION OF NEW YORK

ETHERS OF HYDROXY-BETA-PHENYL-AZO-ALPHA-ALPHA-DIAMINO-PYRIDINES

No Drawing. Application filed June 16, 1930. Serial No. 461,626.

This invention is an improvement in ethers of hydroxy-beta-phenyl-azo-alpha-alpha-diamino-pyridines, in the methods of preparing the same for medicinal use, and in the utilization of the substances in the treatment of pathogenic microbes.

One of the primary objects of the present inventinon is the provision of a compound suitable for internal use because of its easy elimination and relatively great freedom from clinical side reactions.

Another object is the provision of a compound, easily absorbed by the digestive tract, because of its solubility in fats (lipoids), and which when administered will appear in a relatively high concentration in the urine, giving to it from an orange to deep brownish red color, thus to insure a strong action on pathogenic germs in the urinary tract.

In our application Serial No. 348,114, filed on March 18th, 1929, we have shown that the coupling of diazotized amino phenols with alpha-alpha-diamino-pyridine produces valuable medicinal susbtances, and the present invention is a carrying further of the process of the said application.

The simplest ethers, the methoxy- and ethoxy- compounds of hydroxy-beta-phenyl-azo-alpha-alpha-diamino-pyridines can be obtained in different ways. As for instance, by alkylating the soda salt solutions of hydroxy-beta-phenyl-azo-alpha-alpha-diamino-pyridine with alkyl iodine or alkyl sulphate. Or they may be obtained by coupling diazotized anisidines or phenetidines with alpha-alpha-diamino-pyridine in the following manner.

Example

We dissolve 5 gms. of p-anisidine, p-phenetidine, m-phenetidine, or o-phenetidine, in 50 c. c. of water and 20 c. c. of concentrated hydrochloric acid. The solution is cooled to 5° C. and diazotized with a 10% solution of sodium nitrite (2.6 gms. in 26 c. c. of water). When diazotization is completed, a solution of 4 gms. of alpha-alpha-diamino-pyridine in 50 c. c. of water slightly acidified with hydrochloric acid, is added to the diazonium salt solution.

Copulation begins at once, and the reaction mixture is put aside over night. On the following morning, sodium acetate solution, (17° Bé.) is added until only a slightly acid reaction with congo paper is noted. The mixture is then set aside for ten hours, when the hydrochloride of the dye-stuff is collected on a suction filter, washed with water and dried.

The resultant compound varies, of course, with the amino-phenol ether used. With p-anisidine, the resultant product is p-methoxy-beta-phenyl-azo-alpha-alpha-diamino-pyridine hydrochloride, with p-phenetidine, p-ethoxy-beta-phenyl-azo-alpha-alpha-diamino-pyridine hydrochloride, with m-phenetidine, m-ethoxy-beta-phenyl-azo-alpha-alpha-diamino-pyridine hydrochloride, and with o-phenetidine, o-ethoxy-beta-phenyl-azo-alpha-alpha-diamino-pyridine hydrochloride.

The p-methoxy-beta-phenyl-azo-alpha-alpha-diamino-pyridine hydrochloride forms a dark red micro-crystalline powder. The p-ethoxy-beta-phenyl-azo-alpha-alpha-diamino-pyridine hydrochloride forms a dark red, almost black, micro-crystalline powder. The m-ethoxy-beta-phenyl-azo-alpha-alpha-diamino-pyridine hydrochloride forms a red, and the o-ethoxy-beta-phenyl-azo-alpha-alpha-diamino-pyridine hydrochloride a dark red micro-crystalline powder. All are somewhat soluble in cold water, and more so in hot water, and all are very slightly soluble in alcohol, acetone, ether, chloroform and benzol.

The bases of the several hydrochlorides may be obtained from the corresponding hydrochloride by dissolving the hydrochloride in water, and precipitating the base with alkali. Each of the bases is in the form of light yellow needles, the p-methoxy-beta-phenyl-azo-alpha-alpha-diamino-pyridine hydrochloride having a melting point of 182° C., the p-ethoxy-beta-phenyl-azo-alpha-alpha-diamino-pyridine hydrochloride a melting point of 178–179° C., the m-ethoxy-beta-phenyl-azo-alpha-alpha-diamino-pyridine hydrochloride a melting point of 116–117° C., and the o-ethoxy-beta-phenyl-azo-alpha-alpha-diamino-pyridine hydrochloride a melting point of 127° C. All are insoluble in alkalies, very slightly soluble in water, and soluble in the common organic solvents, such as alcohol, ether, acetone, chloroform, benzol, and the like.

The compounds above described are, as is to be expected, of similar character. Since the formula for beta-phenyl-azo-alpha-alpha-diamino-pyridine is

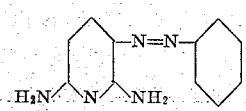

and since these compounds are made through diazotization of anisidine and phenetidine and coupling with alpha-alpha-diamino-pyridine, the formulas for the compounds should be as follows:—

I—P-methoxy-beta-phenyl-azo-alpha-alpha-diamino-pyridine.

II—P-ethoxy-beta-phenyl-azo-alpha-alpha-diamino-pyridine.

III—M-ethoxy-beta-phenyl-azo-alpha-alpha-diamino-pyridine.

IV—O-ethoxy-beta-phenyl-azo-alpha-alpha-diamino-pyridine.

In the formulas we designate the beta position in the pyridine nucleus as the place for the copulation. In general, the azo-group will go into para position to the amino group or in the ortho, if the para position is occupied. In the present case, the azo group is in para position to one, and in ortho position to the other amino group. The compounds will be p-, m-, or o-alkoxy-beta-phenyl-azo-alpha-alpha-diamino-pyridines. There is a possibility that some of the gamma azo compound is formed and that this isomer is present in the above described compounds.

The statements as regards the formulas and in regard to structure are theoretical, and are not intended as limitations. As many other alkylated hydroxy-beta-phenyl-azo-alpha-alpha-diamino-pyridines can be made, which are apparently widely different embodiments of this invention, without departing from the spirit thereof we do not intend to limit ourselves to the specific embodiment herein described.

What is claimed as new is:—

1. The method of obtaining alkylated hydroxy-beta-phenyl-azo-alpha-alpha-diamino-pyridine hydrochlorides, which consists in diazotizing alkoxyaminophenols and coupling with alpha-alpha-diamino-pyridine in hydrochloric acid solution.

2. The method of obtaining an isomer of alkylated hydroxy-beta-phenyl-azo-alpha-alpha-diamino-pyridine hydrochloride, which consists in diazotizing an alkoxyaminophenol and coupling with alpha-alpha-diamino-pyridine in hydrochloric acid solution.

3. The method of obtaining alkylated hydroxy-beta-phenyl-azo-alpha-alpha-diamino-pyridine, which consists in diazotizing alkoxyaminophenols and coupling with alpha-alpha-diamino-pyridine in an acid solution, and subsequently precipitating the free base with an alkali.

4. The method of obtaining an isomer of alkylated hydroxy-beta-phenyl-azo-alpha-alpha-diamino-pyridine, which consists in diazotizing an alkoxyaminophenol and coupling with alpha-alpha-diamino-pyridine in an acid solution, and subsequently precipitating the free base with an alkali.

5. The method of obtaining an isomer of methoxy-beta-phenyl-azo-alpha-alpha-diamino-pyridine hydrochloride, which consists in diazotizing an anisidine, and coupling with alpha-alpha-diamino-pyridine in hydrochloric acid solution.

6. The method of obtaining an isomer of methoxy-beta-phenyl-azo-alpha-alpha-diamino-pyridine, which consists in diazotizing an anisidine and coupling with alpha-alpha-diamino-pyridine in an acid solution, and subsequently precipitating the free base with an alkali.

7. The method of obtaining ethoxy-beta-phenyl-azo-alpha-alpha-diamino-pyridine hydrochlorides, which consists in diazotizing phenetidines and coupling with alpha-alpha-diamino-pyridine in hydrochloric acid solution.

8. The method of obtaining an isomer of ethoxy-beta-phenyl-azo-alpha-alpha-diamino-pyridine hydrochloride, which consists in diazotizing a phenetidine and coupling with alpha-alpha-diamino-pyridine in hydrochloric acid solution.

9. The method of obtaining ethoxy-beta-phenyl-azo-alpha-alpha-diamino-pyridines, which consists in diazotizing phenetidines and coupling with alpha-alpha-diamino-pyridine in an acid solution, and subsequently precipitating the free base with an alkali.

10. The method of obtaining an isomer of ethoxy-beta-phenyl-azo-alpha-alpha-diamino-pyridine, which consists in diazotizing a phenetidine and coupling with alpha-alphadiamino-pyridine in an acid solution, and subsequently precipitating the free base with an alkali.

11. A medicinal substance, for use in the treatment of germ infections, including an isomer of alkylated hydroxy-beta-phenyl-azo-alpha-alpha-diamino-pyridine.

12. A medicinal substance, for use in the treatment of germ infections, including an isomer of methoxy-beta-phenyl-azo-alpha-alpha-diamino-pyridine.

13. A medicinal substance, for use in the treatment of germ infections, including an isomer of ethoxy-beta-phenyl-azo-alpha-alpha-diamino-pyridine.

Signed at New York city, in the county of New York and State of New York, this 13th day of June, A. D. 1930.

EDMOND T. TISZA.
BERNARD JOOS.